United States Patent
Saunders

(10) Patent No.: US 6,310,583 B1
(45) Date of Patent: Oct. 30, 2001

(54) STEERABLE OFFSET REFLECTOR ANTENNA

(75) Inventor: Oliver W. Saunders, Los Angeles, CA (US)

(73) Assignee: TRW Inc., Redondo Beach, CA (US)

(*) Notice: Subject to any disclaimer, the term of this patent is extended or adjusted under 35 U.S.C. 154(b) by 0 days.

(21) Appl. No.: 09/505,813

(22) Filed: Feb. 17, 2000

(51) Int. Cl.$^7$ .................................................. H01Q 13/00
(52) U.S. Cl. ............................................................. 343/786
(58) Field of Search .............................. 343/772, 781 R, 343/781 P, 786, 840; 333/135, 137; 361/233, 234; H01Q 13/02, 13/00

(56) References Cited

U.S. PATENT DOCUMENTS

| | | | |
|---|---|---|---|
| 4,119,967 | * | 10/1978 | Jhonson et al. ...................... 343/756 |
| 4,398,200 | * | 8/1983 | Meier ................................... 343/756 |
| 4,607,260 | * | 8/1986 | Dragone .............................. 343/786 |
| 4,767,981 | * | 8/1988 | Pakulis ............................... 324/58.5 |
| 5,440,316 | * | 8/1995 | Podgorski et al. .................. 343/786 |
| 5,617,108 | * | 4/1997 | Silinsky et al. ..................... 343/786 |
| 5,880,921 | | 3/1999 | Tham et al. ......................... 361/233 |

OTHER PUBLICATIONS

"AlliedSignal Demonstrates Nanotube Artificial Muscle", Spacedaily, May 26, 1999, 2 pps.

* cited by examiner

Primary Examiner—T. Phan
(74) Attorney, Agent, or Firm—Robert W. Keller

(57) ABSTRACT

An antenna system that includes one or more antenna feed horns (30), where each feed horn (30) includes a plurality of micro-mechanical devices (38) positioned around the aperture (32) of the feed horn (30). The micro-mechanical devices (38) are linear motion devices that can be activated to extend a conductive surface (40) beyond the end of the feed horn (30). By selectively actuating groups of the micro-mechanical devices (38) to extend the conductive surfaces (40), the end of the feed horn (30) can be changed to provide different asymmetrical configurations, causing the beam direction to change accordingly. The micro-mechanical devices (38) can be any suitable mechanical device, such as MEMS devices or carbon nanotube artificial muscles.

20 Claims, 2 Drawing Sheets

STEERABLE OFFSET REFLECTOR ANTENNA

BACKGROUND OF THE INVENTION

1. Field of the Invention

This invention relates generally to a steerable antenna feed horn and, more particularly, to an antenna feed horn that employs a series of linear motion mechanical devices, such as micro-electro-mechanical systems (MEMS) or carbon nanotube artificial muscles, to selectively change the end of the feed horn into various asymmetrical configurations to redirect the beam.

2. Discussion of the Related Art

In many high gain, narrow beam communications systems, it is necessary to tightly control the beam pointing direction of a transmitting antenna so that it is accurately directed towards the receiving antenna. For example, in satellite communications systems that operate in the gigahertz frequency range and employ high gain beams, it is necessary that the ground station antenna be accurately pointed at the satellite antenna and the satellite antenna be accurately pointed at the ground reference location to ensure that the highest power portion of the beam is received at the desired location. Because satellites drift relative to the ground station, antenna direction control is necessary to adjust the pointing direction of the satellite antenna or the pointing direction of the ground station antenna to maintain an accurate pointing direction.

To perform this directional control for high gain and high frequency communications systems, it was heretofore necessary to either change the pointing direction of the entire antenna system, and/or adjust the attitude direction of the satellite relative to the ground station. This type of directional control is generally complex and costly to implement and may add significant weight to the satellite. Antenna feed horns with asymmetric openings have heretofore been known in the art to direct the beam being emitted therefrom in a certain direction. However, it would be desirable to selectively control the asymmetry of the feed horn to selectively control the beam pointing direction and reduce system complexity.

An antenna is desired in these communications systems that has a radiation pattern that can be controlled over a relatively small angle without physically moving the entire antenna or its feed, or without the use of a phased antenna array. Such an antenna directional control could be used to compensate for small alignment errors between the antenna and its mounting structure, for example, a spacecraft bus. Also, this antenna could be used in an autotrack system that requires only small angular movement, and to implement beam scanning or hopping over small offsets relative to the nominal beam location.

What is needed is an antenna system for a high gain, high frequency communication system that has tightly controlled directional movement of the antenna beam, without the need to move the entire antenna system. It is therefore an object of the present invention to provide such an antenna system.

SUMMARY OF THE INVENTION

In accordance with the teachings of the present invention, an antenna system is disclosed that includes one or more antenna feed horns, where each feed horn includes a plurality of micro-mechanical devices positioned around the aperture of the feed horn. In one embodiment, the micro-mechanical devices are linear motion devices that can be selectively activated to extend a conductive surface beyond the end of the feed horn. By selectively actuating groups of the micro-mechanical devices to extend the conductive surfaces, the end of the feed horn can be changed to provide different asymmetrical configurations, causing the beam direction to change accordingly. The micro-mechanical devices can be any suitable linear motion mechanical device, for example, MEMS devices or carbon nanotube artificial muscles.

Additional objects, features and advantages of the present invention will become apparent from the following description and appended claims, taken in conjunction with the accompanying drawings.

DETAILED DESCRIPTION OF THE PREFERRED EMBODIMENTS

The following discussion of the preferred embodiments directed to using a plurality of micro-mechanical devices to selectively extend sections of the end of an antenna feed horn to make the end asymmetric to redirect the beam in a desired direction is merely exemplary in nature.

Figure 1:
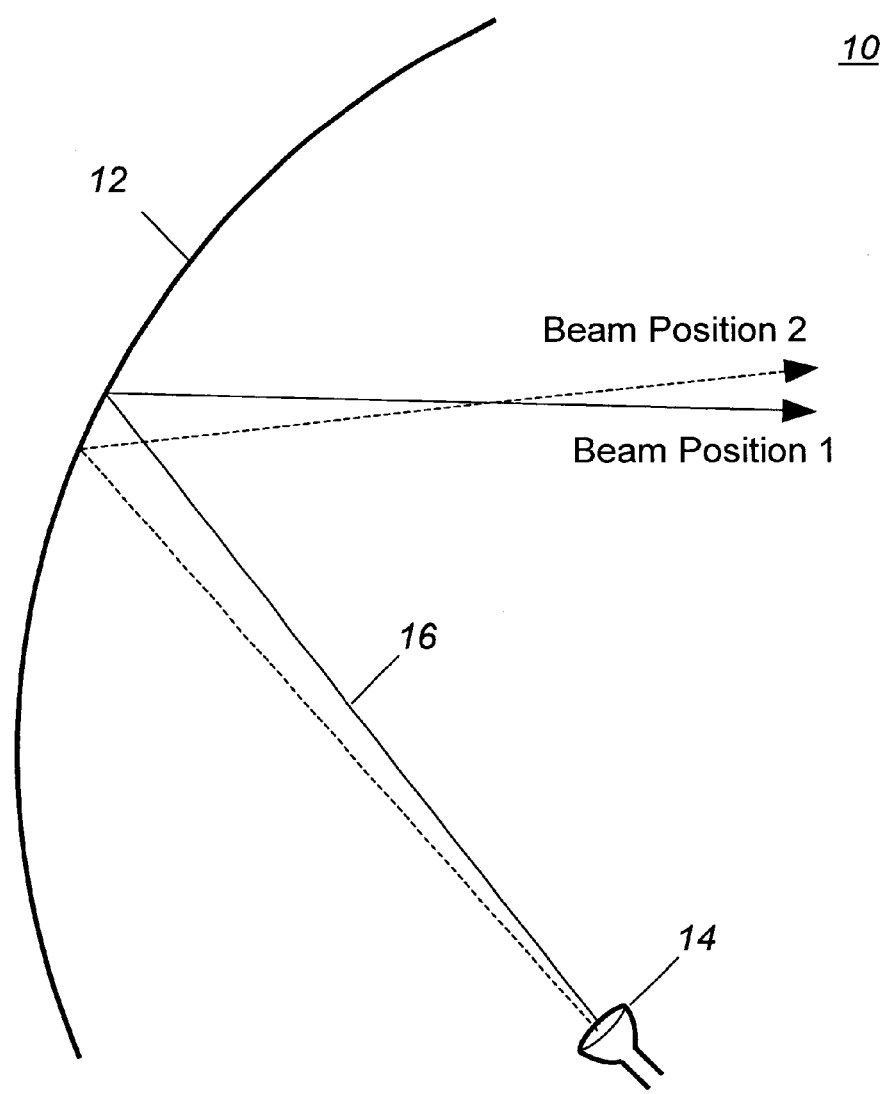
FIG. 1 is a plan view of a reflector and associated feed horn showing two beam directions being reflected from the reflector.

FIG. 1 is a plan view of an antenna system 10 including a reflector 12 and a feed horn 14. The feed horn 14 directs a beam 16 of RF energy towards the reflector 12. FIG. 1 is intended to show that if the beam 16 is reflected off of different positions on the reflector 12, the beam direction changes. The departure angle of the beam 16 from the reflector 12, relative to a line normal to the reflector's surface, is equal to the incident angle from the feed horn 14. The present invention is based on the principal of using a conventional offset feed configuration where the reflector 12 redirects and focuses the beam 16. To accomplish this, the inventive concept proposed by the present invention includes changing the direction of the radiation pattern of the feed horn 14 by mechanically introducing a predetermined and controlled asymmetry to the outer edge of the horn 14.

Figure 2:
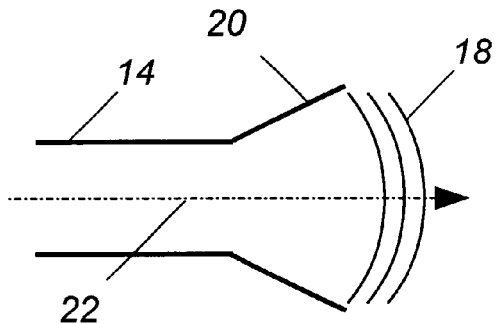
FIGS. 2(a) and 2(b) are plan views of a regular feed horn and an asymmetric feed horn, respectively, showing different beam directions being emitted therefrom.
Figure 2:
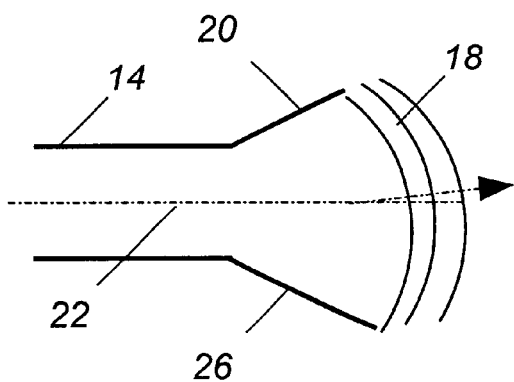

FIGS. 2(a) and 2(b) show beam wavefronts 18 that make up the beam 16 being emitted from an aperture 20 of the horn 14. The aperture 20 of the feed horn 14 shown in FIG. 2(a) is symmetrical, and therefore the beam 16 propagates along the axis 22 of the horn 14. As shown in FIG. 2(b), by introducing a predetermined and controllable asymmetry to the aperture 20 using a conductive surface 26, the induced asymmetry of the aperture 20 redirects the wavefront 18 at an angle relative to the axis 22.

Figure 3:
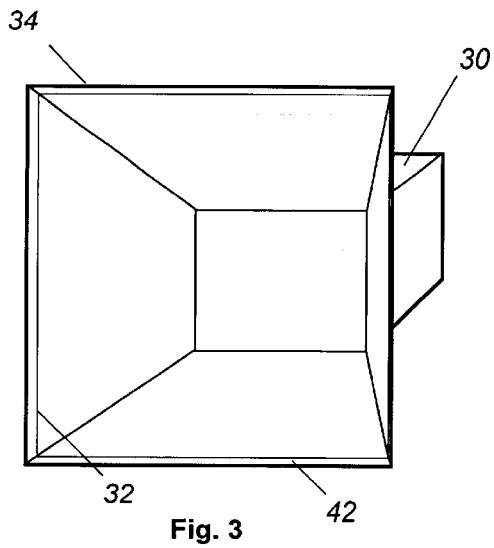
FIG. 3 is an end, perspective view of an antenna feed horn employing a micro-mechanical system at the feed horn aperture that includes a plurality of linear motion mechanical devices, according to the invention.

According to the invention, the shape of the output end of the feed horn is altered by selectively moving a plurality of conductive surfaces attached to micro-mechanical devices mounted to an outside of the feed horn near its output edge. FIG. 3 shows a front perspective view of a feed horn 30 having a rectangular aperture 32. A series of micro-mechanical systems 34 are attached to the outside surface of the feed horn 30 all the way around the perimeter of the aperture 32. As will be discussed below, each micro-mechanical systems 34 selectively positions a conductive surface relative to the aperture 32 to alter the symmetry of the end of the feed horn 30. The systems 34 can extend completely around the aperture 32 or only partially around. Therefore, as discussed above, the direction of the beam 16 can be selectively changed.

Figure 4:
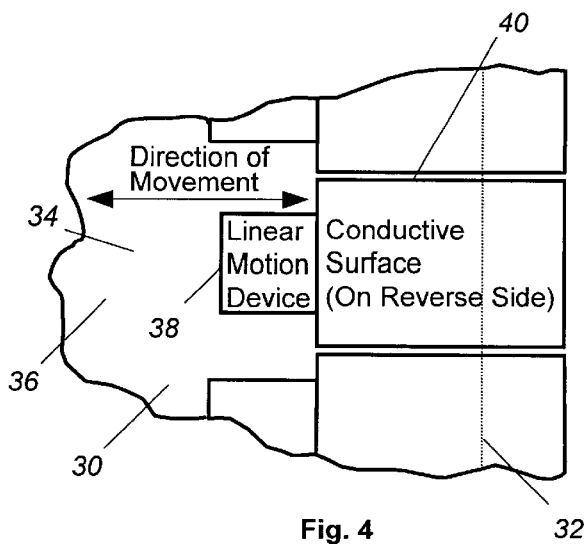
FIG. 4 is a partial view of an end of the feed horn shown in FIG. 3 showing a closeup view of one of the linear motion mechanical devices.

FIG. 4 shows a cut-away portion of the feed horn 30 enlarging a small area of the aperture 32. This view shows one of the micro-mechanical systems 34 being attached to an outer surface 36 of the horn 30. The system 34 includes a linear motion device 38 and a movable member 40. The movable member 40 has a metal surface 42 facing the inside of the horn 30. The metal surface 42 is conductive so that the beam 16 interacts therewith in the same manner as it would with the inside surface of the feed horn 30. In one embodiment, the movable member 40 is a semiconductor substrate that includes a metal surface deposited thereon by any suitable semiconductor fabrication process.

Actuation of the device 38 causes it to translate forward or backward (left and right in FIG. 4) to either extend the member 40 beyond the aperture 32 of the horn 30, or retract the member 40 so that it does not extend beyond the aperture 32 of the horn 30. The member 40 is shown extended beyond the aperture 32 in FIG. 4. The members 40 are selectively moved in groups so that the beam 16 is directed in a desired manner. For example, all of the linear motion devices 38 that are positioned along one side of the aperture 32 can be extended, while maintaining the remaining movable members 40 in their retracted position so that the beam 16 is directed away from that side of the feed horn 30. Also, all of the linear devices 38 positioned on two connecting sides of the feed horn 30 can be extended to redirect the beam 16 in a diagonal direction relative to the aperture 32. Further, it is possible to control the degree that the member 40 extends beyond the aperture 32 so that the direction of the beam 16 is very tightly controlled. In some applications it may be desirable to extend the members 40 their complete range, and in other applications it may be desirable to only extend the members partially beyond the aperture 32, or any combination thereof.

The size and dimensions of the systems 34 may vary from design to design. It is within the scope of the present invention to include hundreds, and possibly thousands, of micro-mechanical devices along a linear inch of the aperture 32 of the horn 30. The systems 34 can be provided all of the way around the aperture 32, or only partly around depending on a particular application. The feed horn 30 is shown with a rectangular opening, but as will be appreciated by those skilled in the art, any shaped feedhorn, including circular, elliptical, etc., can be used within the scope of the present invention.

The devices 38 can be any device suitable for the purposes described herein. For example, the device 38 can be an MEMS device attached to the outer surface 36 of the horn 30 by any suitable attaching mechanism. As is known in the art, a MEMS device is typically a tiny silicon based electromechanical assembly that is fabricated using the same processes as electronic chips. MEMS devices are very lightweight and have been shown to be highly durable and rugged. One design of an MEMS device is disclosed in U.S. Pat. No. 5,880,921 issued Mar. 9, 1999.

In an alternate embodiment, the device 38 can be a carbon nanotube artificial muscle. Carbon nanotube artificial muscles are a new synthetic muscle that are composed of submicroscopic carbon fibers formed into sheets that when properly configured and stimulated perform mechanical work similar to a natural muscle. The nanotube artificial muscles are able to expand and contract in response to a stimulus to provide the linear motion. Artificial muscles of this type are also very light weight, strong and durable.

Figure 5:
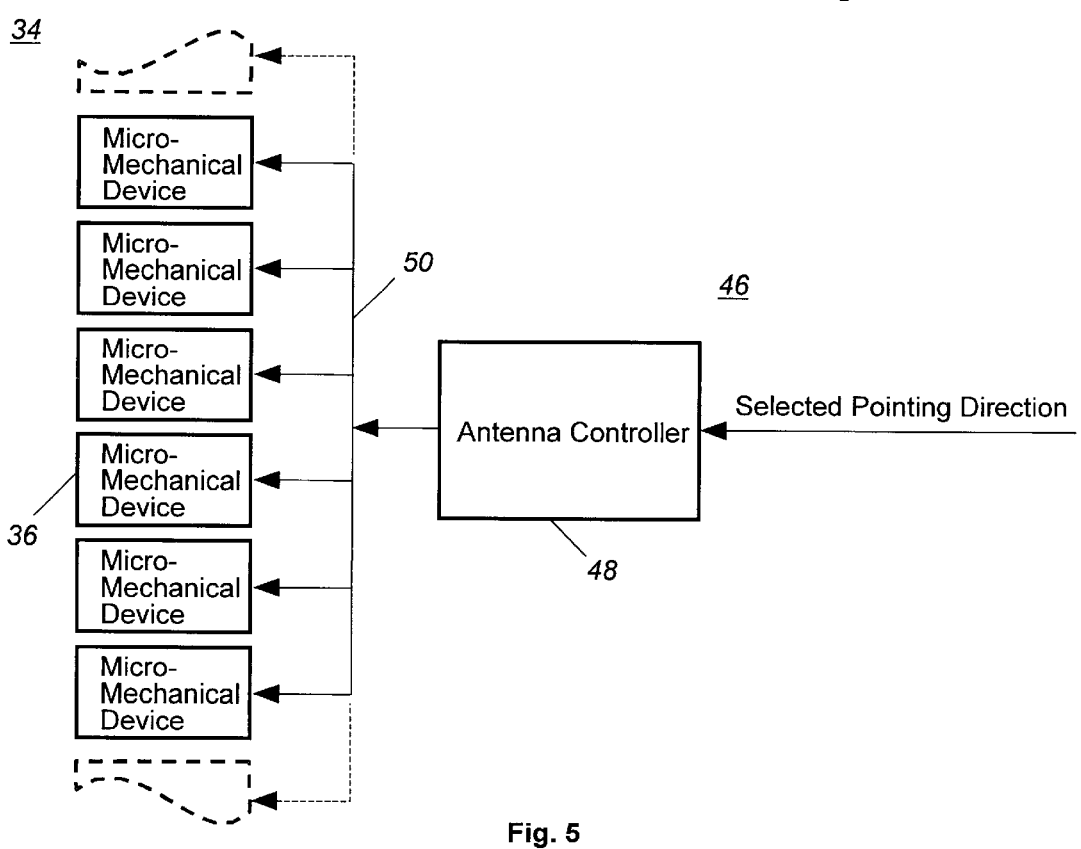
FIG. 5 is an antenna control system for controlling the micro-mechanical devices of the invention.

FIG. 5 is a schematic block diagram of a control system 46 for controlling the plurality of systems 34. The devices 38 are controlled by one or more antenna controllers 48 so that one or more of the devices 38 can be selectively actuated to selectively control the direction of the beam 16. The controller 48 can be set according to predetermined tables, for different desirable antenna directions. The controller 48 sends out control signals on line 50 that cause each micro-mechanical device 38 to actuate the member 40, or not. Currently, the known MEMS devices are electrically powered and controlled, however, photonically powered and controlled devices are envisioned for the future.

The main advantage of the present invention for beam steering purposes is that it is simple, lightweight, and highly efficient. High gain, narrow beamwidth antennas must be pointed accurately to benefit from their performance. Unlike phased arrays, the proposed beam steering mechanism operates independently of the RF power amplification. Therefore, for micro-mechanical devices capable of operating at high intensity RF fields, the antenna according to the present invention can transmit signals from high efficiency, non-linear amplifiers that are inappropriate to transmit phased arrays. For space applications, the antenna system of the invention will simplify systems that require beam hopping. In addition, the antenna will allow spacecraft pointing accuracy requirements to become more relaxed because the antenna's radiation pattern can be readily repointed.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An antenna feed horn, said feed horn directing a radiation beam in a predetermined direction, said feed horn comprising:

an output end through which the beam exits the feed horn, said output end defining an edge;

a plurality of micro-mechanical systems positioned proximate the edge of the horn, each micro-mechanical system including a micro-mechanical device and a movable member; and a control system, connected to the micro-mechanical devices and causing the devices to independently and selectively move in a linear direction, wherein each device causes the movable member to extend beyond the edge of the horn so as to make the output end of the horn asymmetrical and redirect the beam.

2. The feed horn according to claim 1 wherein the micro-mechanical systems are attached to an outer surface of the horn proximate the edge.

3. The feed horn according to claim 1 wherein the movable member includes a conductive surface facing an inside of the horn.

4. The feed horn according to claim 3 wherein the movable member is a semiconductor member including a conductive layer on a side of the semiconductor member facing the inside of the horn.

5. The feed horn according to claim 1 wherein the micro-mechanical systems are spaced apart and positioned around the entire outer edge of the horn.

6. The feed horn according to claim 1 wherein the micro-mechanical devices are linear motion micro-electro-mechanical system devices.

7. The feed horn according to claim 1 wherein the micro-mechanical devices are nanotube artificial muscles.

8. The feed horn according to claim 1 wherein the end of the horn has a shape selected from the group consisting of rectangular, circular and elliptical.

9. An antenna feed horn, said feed horn directing a radiation beam in a predetermined direction, said feed horn comprising:

an output end through which the beam exits the feed horn, said output end defining an edge; and means for selectively configuring the output end into different asymmetrical shapes so as to direct the beam in different directions, said means for configuring including at least one movable member having a conductive surface facing an inside of the horn, said means for configuring causing the at least one movable member to move and change the shape of the output end of the horn.

10. The feed horn according to claim 9 wherein the means for configuring includes transverse linear motion micro-electro-mechanical devices that shape the output end of the feed horn.

11. The feed horn according to claim 9 wherein the means for configuring includes nanotube artificial muscles that shape the output end of the feed horn.

12. The feed horn according to claim 9 wherein the means for configuring are attached to an outside surface of the horn.

13. A method of directing a radiation beam from an end of a feed horn, said method comprising the steps of:

positioning a plurality of micro-mechanical systems around the end of the horn, each micro-mechanical system including a micro-mechanical device and a movable member connected thereto; and causing one or more of the movable members to extend beyond the end of the horn so as to configure the end of the horn to be asymmetrical and direct the radiation beam in a predetermined direction.

14. The method according to claim 13 wherein the step of positioning the micro-mechanical systems includes attaching the micro-mechanical systems to an outer surface of the horn proximate the end.

15. The method according to claim 13 wherein the step of positioning the micro-mechanical systems includes the step of positioning the movable member that includes a semiconductor device having a conductive layer on a side of the semiconductor device facing an inside of the horn.

16. The method according to claim 13 wherein the step of positioning the micro-mechanical systems includes the step of positioning micro-mechanical systems around the entire end of the horn.

17. The method according to claim 13 wherein the step of positioning the micro-mechanical systems includes the step of positioning linear motion micro-electromechanical devices.

18. The method according to claim 13 wherein the step of positioning the micro-mechanical systems includes the step of positioning nanotube artificial muscles.

19. An antenna feed horn, said feed horn directing a radiation beam in a predetermined direction, said feed horn comprising:

an output end through which the beam exits the feed horn, said output end defining an edge; and means for selectively configuring the output end into different asymmetrical shapes so as to direct the beam in different directions, wherein the means for configuring includes transverse linear motion micro-electro-mechanical devices that shape the output end of the feed horn.

20. An antenna feed horn, said feed horn directing a radiation beam in a predetermined direction, said feed horn comprising:

an output end through which the beam exits the feed horn, said output end defining an edge; and means for selectively configuring the output end into different asymmetrical shapes so as to direct the beam in different directions, wherein the means for configuring includes nanotube artificial muscles that shape the output end of the feed horn.

* * * * *